US012627144B2

(12) United States Patent
Bani Shamseh et al.

(10) Patent No.: US 12,627,144 B2
(45) Date of Patent: May 12, 2026

(54) VOLTAGE CONTROL APPARATUS AND VOLTAGE CONTROL METHOD

(71) Applicant: TMEIC CORPORATION, Tokyo (JP)

(72) Inventors: Mohammad Bani Shamseh, Tokyo (JP); Haiqing Li, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 18/997,916

(22) PCT Filed: Jun. 30, 2023

(86) PCT No.: PCT/JP2023/024401

§ 371 (c)(1),
(2) Date: Jan. 23, 2025

(87) PCT Pub. No.: WO2025/004340

PCT Pub. Date: Jan. 2, 2025

(65) Prior Publication Data

US 2026/0018888 A1      Jan. 15, 2026

(51) Int. Cl.
H02J 3/00          (2006.01)
H02J 3/40          (2006.01)
(52) U.S. Cl.
CPC ............... H02J 3/002 (2020.01); H02J 3/40 (2013.01)
(58) Field of Classification Search
CPC ................. H02J 3/002; H02J 3/40; H02J 3/00
See application file for complete search history.

(56) References Cited

U.S. PATENT DOCUMENTS

2020/0028362 A1      1/2020  Rowe et al.

FOREIGN PATENT DOCUMENTS

| CN | 114884132 | A | 8/2022 |
| JP | 2017-229166 | A | 12/2017 |
| JP | 6562232 | B2 | 8/2019 |
| JP | 7183486 | B1 | 12/2022 |

OTHER PUBLICATIONS

Extended European Search Report issued Mar. 18, 2026 in European Patent Application No. 23943728.8.
Andrew Paquette et al., "Virtual Impedance Current Limiting for Inverters in Microgrids With Synchronous Generators", IEEE Transactions On Industry Applications, IEEE Service Center, Piscataway, NJ, US, vol. 51, No. 2, Mar. 1, 2015, pp. 1630-1638, XP011575805, ISSN: 0093-9994, DOI: 10.1109/TIA.2014.2345877 [retrieved on Mar. 17, 2015].

*Primary Examiner* — Robert L Deberadinis
(74) *Attorney, Agent, or Firm* — XSENSUS LLP

(57) ABSTRACT

A voltage control apparatus, when a voltage drop of an output voltage of an inverter is equal to or larger than a threshold, calculates first virtual impedance using various variables, calculates, such that an output current of the inverter does not exceed a rated value, second virtual impedance to be temporarily added to the first virtual impedance, calculates a virtual active voltage and a virtual reactive voltage by multiplying each of an active current and a reactive current calculated by the output current, by virtual impedance obtained by adding up the first virtual impedance and the second virtual impedance, and performs voltage control based on the virtual active voltage and the virtual reactive voltage such that each of the active current and the reactive current can approach each of an active current command value and a reactive current command value required of a power grid.

14 Claims, 6 Drawing Sheets

1.POWER CONVERSION SYSTEM

1:POWER CONVERSION SYSTEM

VOLTAGE CONTROL APPARATUS AND VOLTAGE CONTROL METHOD

TECHNICAL FIELD

The present disclosure relates to a technique for controlling an output voltage of an inverter.

BACKGROUND ART

Patent Literature 1 discloses a technique that can stably continue operation in a power converter (that is, an inverter) that executes control simulating a synchronous generator. In this related art, when an AC voltage of a power grid fluctuates, voltage control is performed such that active power input and output between the power grid and the power converter decreases.

CITATION LIST

Patent Literature

[PTL 1] JP 7183486 B

SUMMARY OF THE INVENTION

Problems to be Solved by the Invention

A case is assumed in which a voltage control-type GFM (Grid Forming) inverter is used as an inverter that supplies an AC voltage to a power grid. In this case, as explained in Patent Literature 1, when the AC voltage of the power grid fluctuates, voltage control is performed to reduce a difference in active power input and output between the power grid and the power converter.

However, even if the voltage control for stabilizing the active power is performed, it is likely that an output current of the inverter cannot reach a reference current required of the power grid and the power grid becomes unstable. Therefore, in order to supply stable active power to the power grid, it is necessary to perform the voltage control to output an active current and a reactive current required of the power grid.

One object of the present disclosure is to provide a technique that, when an AC voltage of a power grid fluctuates, can perform voltage control to output an active current and a reactive current required of the power grid.

Means for Solving the Problems

A first aspect of the present disclosure relates to a voltage control apparatus. The voltage control apparatus includes an inverter that converts DC power output from a battery into AC power and supplies the AC power to a power grid. The voltage control apparatus further includes a controller connected to the inverter. The controller executes: processing for, when a voltage drop of an output voltage of the inverter is equal to or larger than a threshold because of fluctuation in an AC voltage of the power grid, calculating first virtual impedance using variables including an active voltage command value and a reactive voltage command value calculated by a voltage command value and an active current command value and a reactive current command value calculated by the output voltage of the inverter and the voltage command value; processing for calculating, such that an output current of the inverter does not exceed a rated value, second virtual impedance to be temporarily added to the first virtual impedance; processing for calculating a virtual active voltage and a virtual reactive voltage by multiplying each of an active current and a reactive current calculated by the output current, by virtual impedance obtained by adding up the first virtual impedance and the second virtual impedance; and processing for performing voltage control based on the virtual active voltage and the virtual reactive voltage such that each of the active current and the reactive current can approach each of the active current command value and the reactive current command value required of the power grid.

A second aspect of the present disclosure further includes the following characteristics in addition to the first aspect. In the processing for calculating the second virtual impedance, when the voltage drop of the output voltage of the inverter is equal to or larger than the threshold, the controller sets the second virtual impedance to a value corresponding to the output voltage. In the processing for calculating the second virtual impedance, when the voltage drop of the output voltage of the inverter is smaller than the threshold, the controller sets the second virtual impedance to zero.

A third aspect of the present disclosure further includes the following characteristics in addition to the second aspect. The second virtual impedance is reactance consisting of amplitude set by a first variable and a frequency set by a second variable. When the voltage drop of the output voltage of the inverter is equal to or larger than the threshold, the controller sets a value of the first variable to be larger and sets a value of the second variable to be smaller as the output voltage of the inverter is smaller. Further, when the voltage drop of the output voltage of the inverter is equal to or larger than the threshold, the controller sets the value of the first variable to be smaller and sets the value of the second variable to be larger as the output voltage of the inverter is larger.

A fourth aspect of the present disclosure further includes the following characteristics in addition to any one aspect of the first aspect to the third aspect. The variables further include an active voltage and a reactive voltage calculated by the output voltage. In the processing for calculating the virtual impedance, the controller calculates the virtual impedance based on a condition that the reactive voltage is zero, the reactive voltage command value is zero, a voltage value obtained by subtracting the virtual active voltage and the active voltage from the active voltage command value is zero, and a voltage value obtained by subtracting the virtual reactive voltage and the reactive voltage from the reactive voltage command value is zero.

A fifth aspect of the present disclosure further includes the following characteristics in addition to any one aspect of the first aspect to the third aspect. The first virtual impedance includes resistance and reactance. In the processing for calculating the first virtual impedance, the controller calculates each of the resistance and the reactance corresponding to the output voltage.

A sixth aspect of the present disclosure further includes the following characteristics in addition to any one aspect of the first aspect to the third aspect. The active current command value is calculated by multiplying a differential voltage obtained by calculating a difference between the voltage command value and the output voltage, by a constant value. The reactive current command value is calculated such that a sum obtained by adding up a square value of the active current command value and a square value of the reactive current command value is 1.

A seventh aspect of the present disclosure further includes the following characteristics in addition to the sixth aspect.

The active current command value is represented by a percentage. When a calculation result of the active current command value exceeds 100%, the controller sets the active current command value to 100%.

An eighth aspect of the present disclosure relates to a voltage control method. The voltage control method includes: converting, using an inverter, DC power output from a battery into AC power and supplying the AC power to a power grid; when a voltage drop of an output voltage of the inverter is equal to or larger than a threshold because of fluctuation in an AC voltage of the power grid, calculating first virtual impedance using variables including an active voltage command value and a reactive voltage command value calculated by a voltage command value and an active current command value and a reactive current command value calculated by the output voltage of the inverter and the voltage command value; calculating, such that an output current of the inverter does not exceed a rated value, second virtual impedance to be temporarily added to the first virtual impedance; calculating a virtual active voltage and a virtual reactive voltage by multiplying each of an active current and a reactive current calculated by the output current, by virtual impedance obtained by adding up the first virtual impedance and the second virtual impedance; and performing voltage control based on the virtual active voltage and the virtual reactive voltage such that each of the active current and the reactive current can approach each of the active current command value and the reactive current command value required of the power grid.

Advantageous Effects of the Invention

According to the present disclosure, when a voltage drop of an output voltage of an inverter is equal to or larger than a threshold because of fluctuation in an AC voltage of a power grid, first virtual impedance is calculated based on a voltage command value and the output voltage of the inverter. Second virtual impedance to be temporarily added to the first virtual impedance is calculated such that an output current of the inverter does not exceed a rated value. A virtual active voltage and a virtual reactive voltage are generated based on virtual impedance obtained by adding up the first virtual impedance and the second virtual impedance. Voltage control is performed based on the virtual active voltage and the virtual reactive voltage such that each of an active current and a reactive current output from the inverter can approach each of an active current command value and a reactive current command value required of the power grid. Consequently, even if the AC voltage of the power grid fluctuates, it is possible to output the active current and the reactive current required of the power grid. Therefore, it is possible to stabilize the power grid.

DESCRIPTION OF EMBODIMENTS

Figure 1:
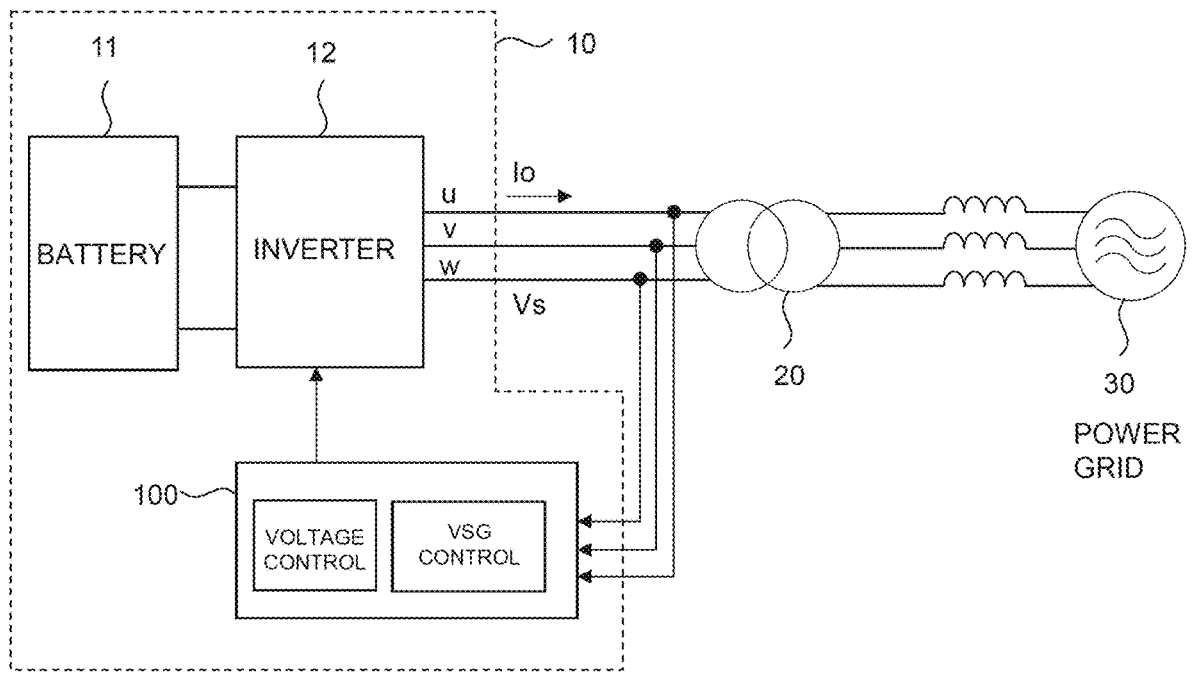
FIG. 1 is a diagram for explaining an overview of a power conversion system.

A voltage control apparatus and a voltage control method according to an embodiment of the present disclosure are explained with reference to the accompanying drawings. The same reference numerals and signs are added to common elements in the figures and redundant explanation of the elements is omitted.

1. OVERVIEW OF A POWER CONVERSION SYSTEM

FIG. 1 is a diagram for explaining an overview of a power conversion system 1. The power conversion system 1 includes a voltage control apparatus 10, a transformer 20, and a power grid 30. The voltage control apparatus 10 includes a battery 11, an inverter 12, and a controller 100.

The inverter 12 is a device that converts DC power output from the battery 11 into AC power and supplies the AC power to the power grid 30 via the transformer 20. As the inverter 12, a voltage control-type GFM inverter is exemplified.

The controller 100 is a device that is connected to the inverter 12 and controls output power output from the inverter 12. Specifically, a detection value of an output voltage Vs (hereinafter referred to as Vs detection value) and a detection value of an output current Io (hereinafter referred to as Io detection value) output from the inverter 12 are input to the controller 100. The Vs detection value and the Io detection value are detected by a detector (not illustrated) provided between the voltage control apparatus 10 and the power grid 30. Note that, in an example illustrated in FIG. 1, the Vs detection value and the Io detection value detected between the voltage control apparatus 10 and the transformer 20 are input to the controller 100. However, the Vs detection value and the Io detection value detected between the transformer 20 and the power grid 30 may be input to the controller 100. In this way, a detection value of an AC voltage of the power grid 30 may be the Vs detection value. A detection value of an AC current of the power grid 30 may be the Io detection value.

Note that the output voltage Vs output from the inverter 12 consists of three phase voltages (Vsu, Vsv, and Vsw). The output current Io output from the inverter 12 consists of three phase currents (Iou, Iov, and Iow). That is, the Vs detection value explained above includes a Vsu detection value, a Vsv detection value, and a Vsw detection value. The Io detection value explained above includes an Iou detection value, an Iov detection value, and an Iow detection value.

The controller 100 executes VSG (Virtual Synchronous Generator) control based on the Vs detection value and the Io detection value input to the controller 100. VSG means a virtual synchronous generator that simulatively imparts dynamic characteristics of a synchronous generator to the inverter 12. That is, the VSG control means controlling the virtual synchronous generator. The dynamic characteristics of the synchronous generator include an inertia constant M and a braking constant D. Consequently, it is possible to prevent the power grid 30 from becoming unstable when a system accident occurs, that is, LVRT (Low Voltage Ride Through) occurs.

Further, when the LVRT occurs, the controller 100 performs, based on an execution result of the VSG control, voltage control for the inverter 12 such that the output current Io output from the inverter 12 has a current value required of the power grid 30. The voltage control includes generation of the three phase voltages (Vsu, Vsv, and Vsw)

and PWM control for performing pulse width modulation on each of the three phase voltages. The controller 100 outputs a voltage control signal generated by the PWM control to the inverter 12. Consequently, the inverter 12 can reduce, based on the voltage control signal, a difference in AC power between the power grid 30 and the inverter 12.

2. SPECIFIC EXAMPLE OF THE VOLTAGE CONTROL APPARATUS

2-1. Configuration Example of the Controller

The controller 100 includes hardware for implementing various functions. The hardware may be a processing circuit or may be a computer that executes, with a CPU, a program stored in a storage device. As the processing circuit, an FPGA (Field Programmable Gate Array), an ASIC (Application Specific Integrated Circuit), and the like are exemplified.

2-2. Function Example of the Controller

Figure 2:
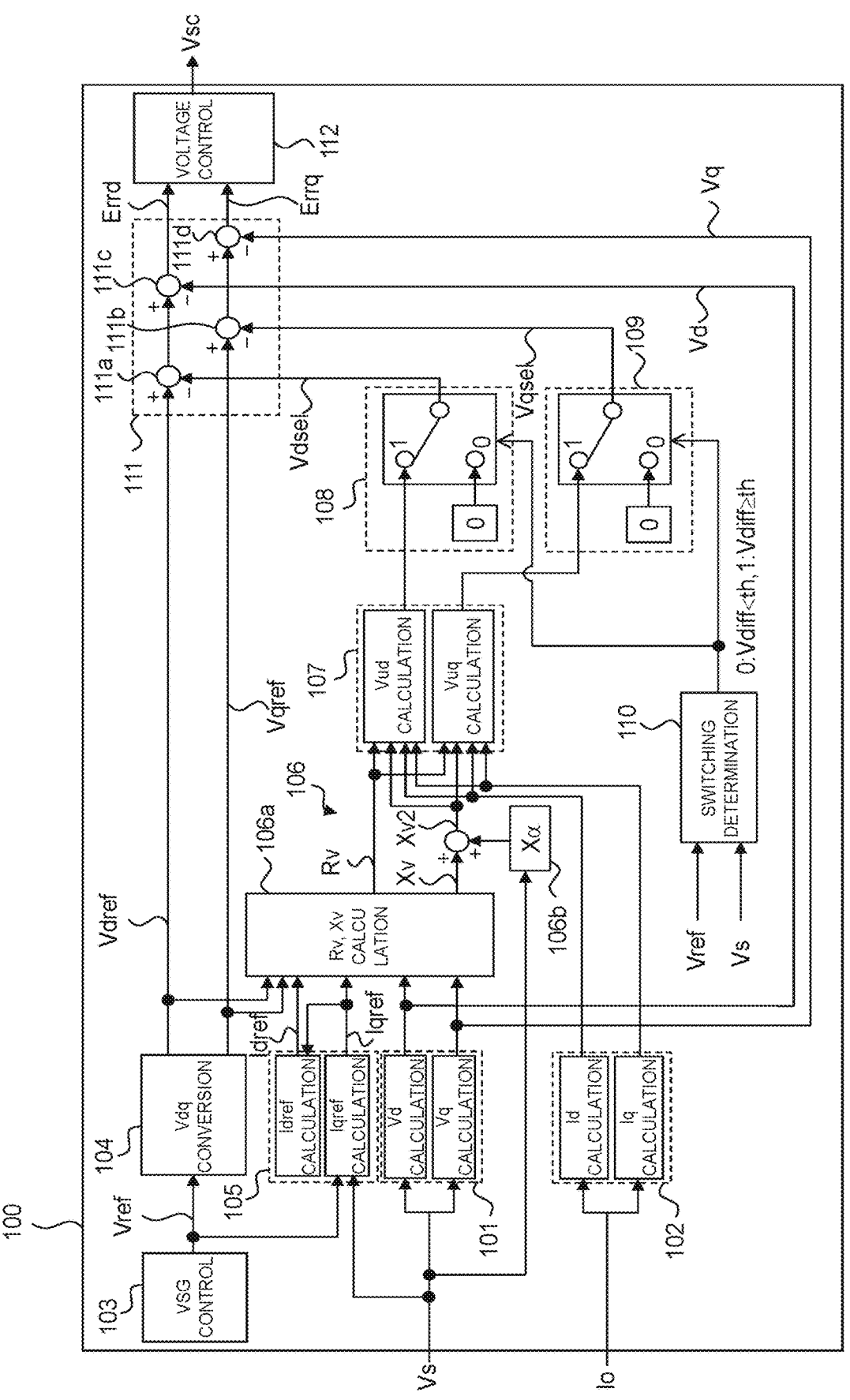
FIG. 2 is a block diagram illustrating a function example of a controller in a voltage control apparatus according to an embodiment.

FIG. 2 is a block diagram illustrating a function example of the controller 100 in the voltage control apparatus 10 according to the embodiment. The controller 100 includes an active and reactive voltages calculation processing unit 101, an active and reactive currents calculation processing unit 102, a VSG control unit 103, a dq-axis voltage conversion unit 104, a dq-axis current command calculation unit 105, virtual impedance generation unit 106, first virtual impedance generation unit 106a, second virtual impedance generation unit 106b, a virtual voltage generation unit 107, a first output selection circuit 108, a second output selection circuit 109, a switching determination circuit 110, an addition and subtraction circuit 111, and a voltage control circuit 112.

The active and reactive voltages calculation processing unit 101 calculates an active voltage Vd and a reactive voltage Vq based on the Vs detection value input to the controller 100. The active voltage Vd and the reactive voltage Vq calculated by the active and reactive voltages calculation processing unit 101 are represented, as an example, by the following Expression (1).

[Math. 1]

$$\begin{bmatrix} Vd \\ Vq \end{bmatrix} = \begin{bmatrix} \sin\theta & \sin(\theta-120°) & \sin(\theta+120°) \\ \cos\theta & \cos(\theta-120°) & \cos(\theta+120°) \end{bmatrix} \begin{bmatrix} Vsu \\ Vsv \\ Vsw \end{bmatrix} \quad (1)$$

The active and reactive currents calculation processing unit 102 calculates an active current Id and a reactive current Iq based on the Io detection value input to the controller 100. The active current Id and the reactive current Iq calculated by the active and reactive currents calculation processing unit 102 are represented, as an example, by the following Expression (2).

[Math. 2]

$$\begin{bmatrix} Id \\ Iq \end{bmatrix} = \begin{bmatrix} \sin\theta & \sin(\theta-120°) & \sin(\theta+120°) \\ \cos\theta & \cos(\theta-120°) & \cos(\theta+120°) \end{bmatrix} \begin{bmatrix} Iou \\ Iov \\ Iow \end{bmatrix} \quad (2)$$

The VSG control unit 103 generates a voltage command value Vref of the output voltage Vs of the inverter 12. The voltage command value Vref is, for example, a fixed value determined according to the power grid 30 connected to the inverter 12. The voltage command value Vref includes a d-axis voltage command value Vdref and a q-axis voltage command value Vqref.

The d-axis voltage command value Vdref is referred to as active voltage command value Vdref as well. The q-axis voltage command value Vqref is referred to as reactive voltage command value Vqref as well. The dq-axis voltage conversion unit 104 converts the voltage command value Vref generated by the VSG control unit 103 into the active voltage command value Vdref and the reactive voltage command value Vqref.

When LVRT has occurred according to fluctuation in the AC voltage of the power grid 30, the dq-axis current command calculation unit 105 calculates, based on the voltage command value Vref and the Vs detection value, a d-axis current command value Idref and a q-axis current command value Iqref required of the power grid 30. The d-axis current command value Idref is referred to as active current command value Idref as well. The q-axis current command value Iqref is referred to as reactive current command value Iqref as well. Each of the active current command value Idref and the reactive current command value Iqref calculated by the dq-axis current command calculation unit 105 is represented by the following Expression (3) and Expression (4). In Expression (3), k is a constant value determined by the specifications of the inverter 12. ΔV is a differential voltage Vdiff obtained by calculating a difference between the voltage command value Vref and the Vs detection value.

[Math. 3]

$$Iqref = k\Delta V \quad (3)$$

[Math. 4]

$$Iqref = \sqrt{1 - Iqref^2} \quad (4)$$

Here, when variables used in Expression (3) and Expression (4) are represented by percentages, the active current command value Idref is calculated not to exceed 100%. Specifically, when a voltage drop of the Vs detection value decreases to 60%, ΔV is Vdref−Vs=100%−60%=40%. When k is set to a constant value "2", Iqref is 2×40%=80%. In this case, since Iqref does not exceed 100%, Iqref is 80%. Note that the reactive current command value Iqref is calculated such that a sum obtained by adding up a square value of the active current command value Idref and a square value of the reactive current command value Iqref is 1. Therefore, when the active current command value Idref is 80%, the reactive current command value Iqref is 60% according to Expression (4).

Subsequently, a case is assumed in which the voltage drop of the Vs detection value decreases to 10%. In this case, ΔV is Vdref−Vs=100%—10%=90%. When k is set to the constant value "2", Iqref is 2×90%=180%. In this case, since Iqref exceeds 100%, Iqref is an upper limit value of 100%. Note that, when the active current command value Idref is 100%, the reactive current command value Iqref is 0% according to Expression (4).

The virtual impedance generation unit 106 includes the first virtual impedance generation unit 106a and the second virtual impedance generation unit 106b. When the voltage drop of the Vs detection value is equal to or larger than a threshold, that is, the differential voltage Vdiff obtained by calculating a difference between the Vs detection value and the voltage command value Vref is equal to or larger than a threshold, the first virtual impedance generation unit 106*a* calculates first virtual impedance to raise the output voltage Vs of the inverter 12. The first virtual impedance includes resistance Rv and reactance Xv. Each of the resistance Rv and the reactance Xv is calculated based on the active voltage command value Vdref, the reactive voltage command value Vqref, the active current command value Idref, the reactive current command value Iqref, the active voltage Vd, and the reactive voltage Vq.

The second virtual impedance generation unit 106*b* is a circuit that generates second impedance. The second impedance means reactance Xα. The reactance Xα is calculated based on the Vs detection value and added to the reactance Xv generated by the first virtual impedance generation unit 106*a*. That is, the virtual impedance generation unit 106 calculates reactance Xv2 obtained by adding up the reactance Xv and the reactance Xα. The virtual impedance generation unit 106 outputs the resistance Rv and the reactance Xv2 to the virtual voltage generation unit 107 explained below. Details of the calculation of the resistance Rv and the reactance Xv2 and details of the generation of the reactance Xα are explained below.

The virtual voltage generation unit 107 generates, based on the resistance Rv, the reactance Xv2, the active current Id, and the reactive current Iq, a virtual active voltage Vud and a virtual reactive voltage Vuq for raising the output voltage Vs of the inverter 12. Each of the virtual active voltage Vud and the virtual voltage generation unit 107 calculated by the virtual voltage generation unit 107 is represented, as an example, by the following Expression (5).

[Math. 5]

$$\begin{bmatrix} Vud \\ Vuq \end{bmatrix} = \begin{bmatrix} Id & -Iq \\ Iq & Id \end{bmatrix} \begin{bmatrix} Rv \\ Xv2 \end{bmatrix} \quad (5)$$

The first output selection circuit 108 is a change-over switch including two input terminals and one output terminal. The first output selection circuit 108 switches the two input terminals to select one input terminal of the two input terminals. Specifically, when a switching determination result input to the first output selection circuit 108 is "0", the first output selection circuit 108 switches the two input terminals to select a first input terminal. On the other hand, when the switching determination result input to the first output selection circuit 108 is "1", the first output selection circuit 108 switches the two input terminals to select a second input terminal. In the example illustrated in FIG. 2, a fixed value (a value of zero) is input to the first input terminal of the first output selection circuit 108 and the virtual active voltage Vud is input to the second input terminal of the first output selection circuit 108.

The switching determination result is generated by the switching determination circuit 110. The switching determination circuit 110 outputs "0" as the switching determination result when the differential voltage Vdiff between the Vs detection value and the voltage command value Vref is smaller than the threshold, that is, the AC voltage of the power grid 30 is not in a state of LVRT. On the other hand, the switching determination circuit 110 outputs "1" as the switching determination result when the differential voltage Vdiff between the Vs detection value and the voltage command value Vref is equal to or larger than the threshold, that is, when the AC voltage of the power grid 30 is in the state of LVRT. The first output selection circuit 108 outputs a voltage input to the selected input terminal. The voltage output from the first output selection circuit 108 is referred to as selected active voltage Vdsel.

The second output selection circuit 109 is a change-over switch including two input terminals and one output terminal. The second output selection circuit 109 switches the two input terminals to select one input terminal of the two input terminals. Specifically, when a switching determination result input to the second output selection circuit 109 is "0", the second output selection circuit 109 switches the two input terminals to select a first input terminal. On the other hand, when the switching determination result input to the second output selection circuit 109 is "1", the second output selection circuit 109 switches the two input terminals to select a second input terminal. In the example illustrated in FIG. 2, a fixed value (a value of zero) is input to the first input terminal of the second output selection circuit 109 and the virtual reactive voltage Vuq is input to the second input terminal of the second output selection circuit 109.

As explained above, the switching determination result is generated by the switching determination circuit 110. The second output selection circuit 109 outputs a voltage input to the selected input terminal. The voltage output from the second output selection circuit 109 is referred to as selected reactive voltage Vqsel.

The addition and subtraction circuit 111 includes four addition and subtraction circuits (a first addition and subtraction circuit 111*a*, a second addition and subtraction circuit 111*b*, a third addition and subtraction circuit 111*c*, and a fourth addition and subtraction circuit 111*d*). The first addition and subtraction circuit 111*a* is an addition and subtraction circuit that performs addition for adding the active voltage command value Vdref and performs subtraction for subtracting the selected active voltage Vdsel. The second addition and subtraction circuit 111*b* is an addition and subtraction circuit that performs addition for adding the reactive voltage command value Vqref and performs subtraction for subtracting the selected reactive voltage Vqsel. The third addition and subtraction circuit 111*c* is an addition and subtraction circuit that performs addition for adding an output of the first addition and subtraction circuit 111*a* and performs subtraction for subtracting the active voltage Vd. The fourth addition and subtraction circuit 111*d* is an addition and subtraction circuit that performs addition for adding an output of the second addition and subtraction circuit 111*b* and performs subtraction for subtracting the reactive voltage Vq.

When an active voltage output from the third addition and subtraction circuit 111*c* is represented as abnormal active voltage Errd and a reactive voltage output from the fourth addition and subtraction circuit 111*d* is represented as an abnormal reactive voltage Errq, a relational expression of Expression (6) described below holds.

[Math. 6]

$$\begin{bmatrix} Vdref \\ Vqref \end{bmatrix} - \begin{bmatrix} Vud \\ Vuq \end{bmatrix} - \begin{bmatrix} Vd \\ Vq \end{bmatrix} = \begin{bmatrix} Errd \\ Errq \end{bmatrix} \quad (6)$$

When Expression (5) is substituted in Expression (6), the relational expression is represented by the following Expression (7).

[Math. 7]

$$\begin{bmatrix} Vdref \\ Vqref \end{bmatrix} - \begin{bmatrix} Id & -Iq \\ Iq & Id \end{bmatrix} \begin{bmatrix} Rv \\ Xv2 \end{bmatrix} - \begin{bmatrix} Vd \\ Vq \end{bmatrix} = \begin{bmatrix} Errd \\ Errq \end{bmatrix} \quad (7)$$

In this case, if both of the abnormal active voltage Errd and the abnormal reactive voltage Errq are the value of zero, this means that both of the virtual active voltage Vud and the virtual reactive voltage Vuq are appropriate voltage values.

That is, by setting both of the abnormal active voltage Errd and the abnormal reactive voltage Errq to zero in advance, it is possible to calculate optimum values of the virtual active voltage Vud and the virtual reactive voltage Vuq.

Further, it is desirable that a power factor obtained by representing the active voltage Vd with respect to the output voltage Vs of the inverter 12 as a percentage is high. For this reason, both of the reactive voltage Vq and the reactive voltage command value Vqref are set to zero. Therefore, in Expression (7), when Errd=0, Errq=0, the reactive voltage Vq=0, and the reactive voltage command value Vqref=0, each of the resistance Rv and the reactance Xv2 is represented, as an example, by the following Expression (8).

[Math. 8]

$$\begin{bmatrix} Rv \\ Xv2 \end{bmatrix} = \frac{1}{Idref^2 + Iqref^2} \begin{bmatrix} Vdref - Vd & 0 \\ 0 & Vd - Vdref \end{bmatrix} \begin{bmatrix} Idref \\ Iqref \end{bmatrix} \quad (8)$$

Consequently, since a calculation formula for the virtual impedance obtained by adding up the first virtual impedance and the second virtual impedance includes the active current command value Idref and the reactive current command value Iqref, the voltage control apparatus 10 can output an appropriate active current Id and an appropriate reactive current Iq to the power grid 30. Further, since the virtual impedance includes the second virtual impedance, impedance increases. Therefore, the voltage control apparatus 10 can control the output current Io of the inverter 12 not to exceed the rated value. Consequently, it is possible to suppress an overcurrent in the output current Io of the inverter 12.

The voltage control circuit 112 is a circuit that performs voltage control based on the virtual active voltage Vud and the virtual reactive voltage Vuq calculated based on the virtual impedance (the resistance Rv and the reactance Xv2) such that each of the active current Id and the reactive current Iq can approach each of the active current command value Idref and the reactive current command value Iqref required of the power grid 30. The voltage control circuit 112 outputs a voltage control signal Vsc generated by the voltage control.

Note that, as explained above, the voltage control includes the processing for generating the three phase voltages (Vsu, Vsv, and Vsw) and the PWM control for performing the pulse width modulation on each of the three phase voltages. In the PWM control, the generated three phase voltages are controlled to have a predetermined pulse width and a predetermined frequency. For example, PI control is used for the generation of the three phase voltages by the voltage control.

2-3. Calculation Example of the Second Virtual Impedance (Xα)

Figure 3:
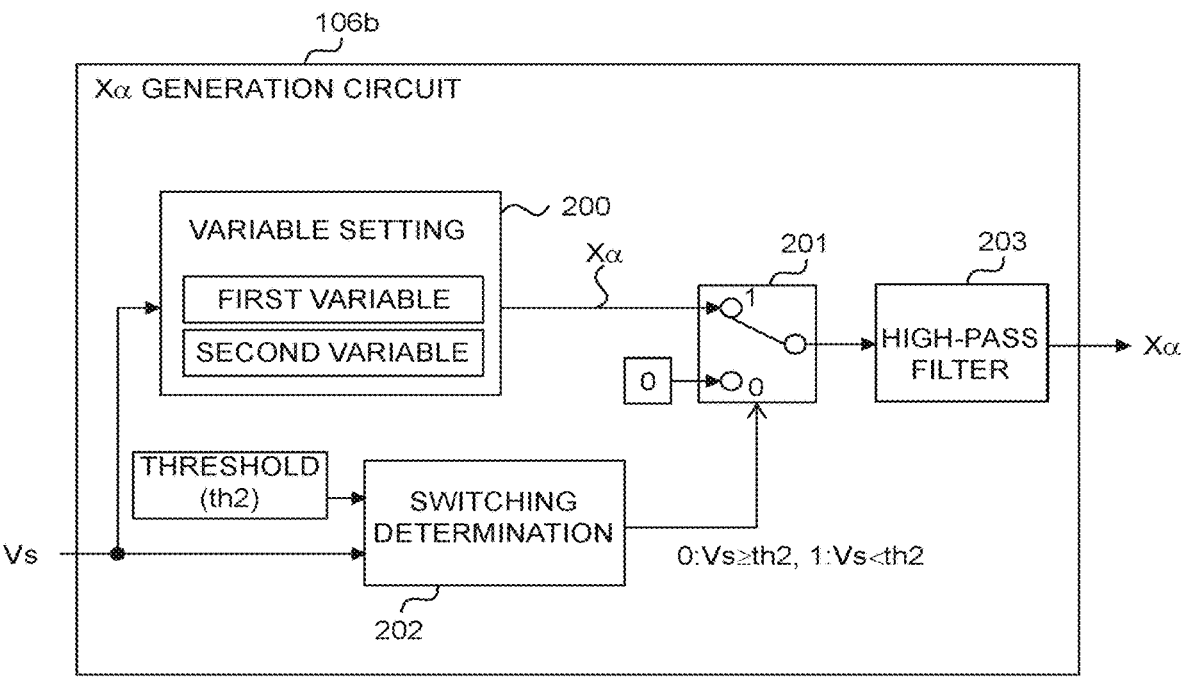
FIG. 3 is a block diagram illustrating a function example of a circuit that generates second virtual impedance ($X\alpha$) of the controller in the voltage control apparatus according to the embodiment.

FIG. 3 is a block diagram illustrating a function example of a circuit that generates the second virtual impedance (Xα) of the controller 100 in the voltage control apparatus 10 according to the embodiment. Specifically, FIG. 3 illustrates a function example of the second virtual impedance generation unit 106b. The second virtual impedance generation unit 106b includes a variable setting unit 200, a third output selection circuit 201, a switching determination circuit 202, and a high-pass filter unit 203.

The variable setting unit 200 sets each of a first variable and a second variable based on the Vs detection value input to the second virtual impedance generation unit 106b. The variable setting unit 200 outputs the reactance Xα generated based on the first variable and the second variable. The first variable is a variable for setting the amplitude of the reactance Xα. An amplitude corresponding to the Vs detection value is set. The second variable is a variable for setting a frequency of the reactance Xα. A frequency corresponding to the Vs detection value is set.

A setting value of the first variable is considered. For example, when the Vs detection value is small, to reduce a difference in AC power between the power grid 30 and the inverter 12, it is necessary to increase a rising degree of the output current Io. Therefore, in this case, the controller 100 sets a value of the first variable to a large value. On the other hand, when the Vs detection value is large, to reduce the difference in the AC power between the power grid 30 and the inverter 12, it is necessary to reduce the rising degree of the output current Io. Therefore, in this case, the controller 100 sets the value of the first variable to a small value.

Subsequently, a setting value of the second variable is considered. For example, when the Vs detection value is small, as explained above, it is necessary to increase the rising degree of the output current Io. In this case, it is expected that a fixed time is required until the output current Io is raised to a predetermined current value. Therefore, when the Vs detection value is small, the controller 100 sets a value of a frequency, which is the second variable, to a small value to extend a time in which the reactance Xα is active.

On the other hand, when the Vs detection value is large, as explained above, it is necessary to reduce the rising degree of the output current Io. In this case, it is expected that the time required until the output current Io is raised to the predetermined current value is short. Therefore, when the Vs detection value is large, the controller 100 sets the value of the frequency, which is the second variable, to a large value to reduce the time in which the reactance Xα is active.

As explained above, the value of the first variable is set to be larger and the value of the second variable is set to be smaller as the Vs detection value is smaller. The value of the first variable is set to be smaller and the value of the second variable is set to be larger as the Vs detection value is larger.

The third output selection circuit 201 is a change-over switch including two input terminals and one output terminal. The third output selection circuit 201 switches the two input terminals to select one input terminal of the two input terminals. Specifically, when a switching determination result input to the third output selection circuit 201 is "0", the third output selection circuit 201 switches the two input terminals to select a first input terminal. On the other hand, when the switching determination result input to the third output selection circuit 201 is "1", the third output selection circuit 201 switches the two input terminals to select a second input terminal. In the example illustrated in FIG. 3, a fixed value (a value of zero) is input to the first input terminal of the third output selection circuit 201. The reactance Xα generated by the variable setting unit 200 is input to the second input terminal of the third output selection circuit 201.

The switching determination result is generated by the switching determination circuit 202. When the Vs detection value is equal to or larger than a threshold th2, that is, when the output current Io of the inverter 12 is equal to or smaller than a rated value of the inverter 12, the switching determination circuit 202 outputs "0" as the switching determination result. On the other hand, when the Vs detection value is smaller than the threshold th2, that is, when the output current Io of the inverter 12 exceeds the rated value of the inverter 12, the switching determination circuit 202 outputs "1" as the switching determination result. As the reactance Xα output from the third output selection circuit 201, a value (the reactance Xα or zero) input to a selected input terminal is output.

The high-pass filter unit 203 is a high-pass filter that removes an unnecessary signal component before the reactance Xα is output from the second virtual impedance generation unit 106b.

Note that the variable setting unit 200 explained above is provided on an input side of the third output selection circuit 201 but may be provided on an output side of the third output selection circuit 201.

2-4. Output Result Example of Virtual Impedance

Figure 4A:
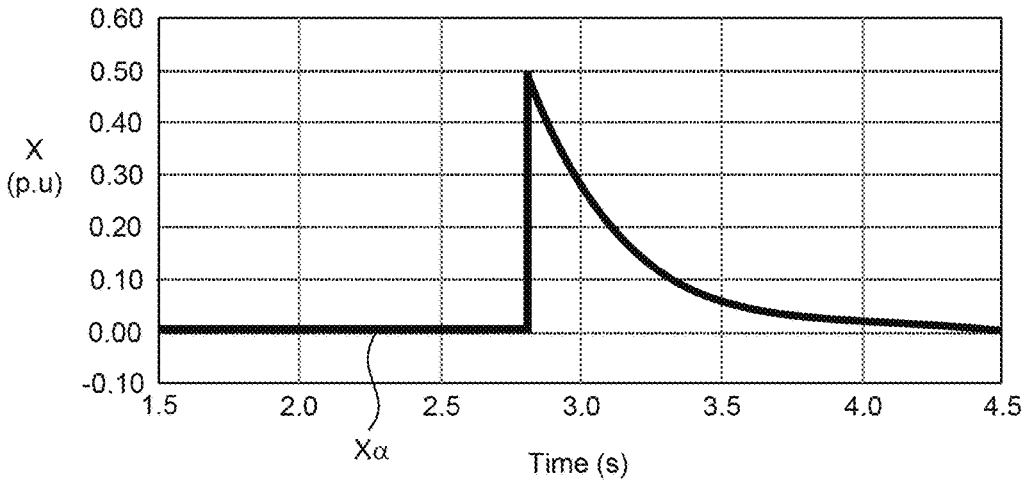
FIG. 4A and FIG. 4B are diagrams for explaining an output result example of virtual impedance of the controller in the voltage control apparatus according to the embodiment.
Figure 4B:
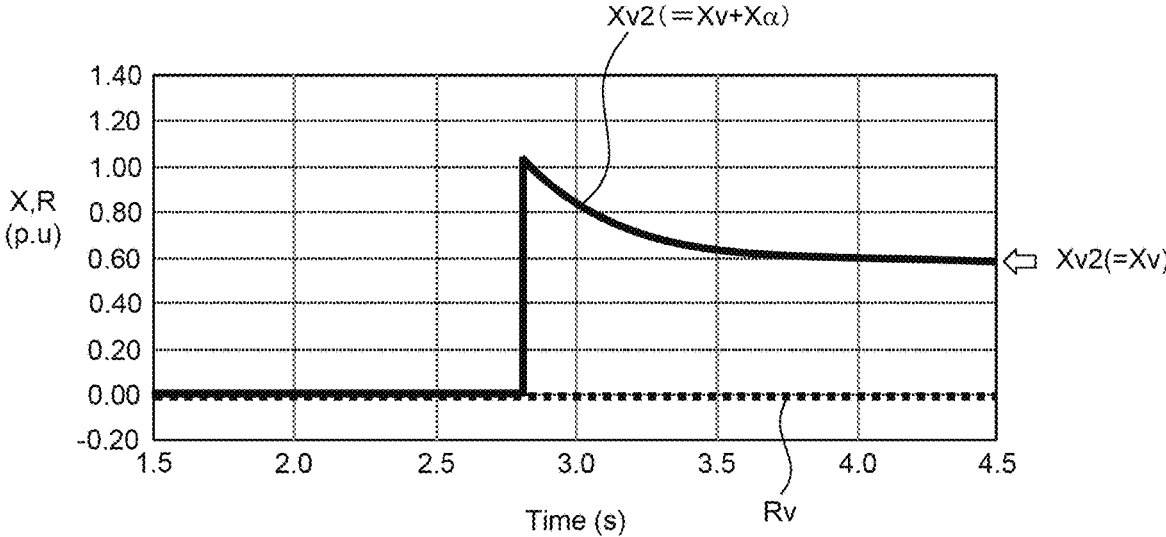

FIG. 4A and FIG. 4B are diagrams for explaining an output result example of virtual impedance of the controller 100 in the voltage control apparatus 10 according to the embodiment. FIG. 4A illustrates an example of a waveform of the reactance Xα output from the second virtual impedance generation unit 106b. FIG. 4B illustrates an example of a waveform of the reactance Xv2 input to the virtual voltage generation unit 107. Note that, in the examples illustrated in FIG. 4A and FIG. 4B, values of the reactance Xα and the reactance Xv2 are represented by PU (Per Unit). However, the values may be represented by percentages.

In the example illustrated in FIG. 4A, a waveform of the reactance Xα in the case in which the first variable used for the generation of the reactance Xα is set to "0.5 p.u" and the second variable used for the generation of the reactance Xα is set to "0.7 Hz" is illustrated. The first variable is set, for example, between 0.2 p.u and 0.6 p.u. The second variable is set, for example, between 0.3 Hz and 2 Hz.

As illustrated in FIG. 4A, the reactance Xα steeply rises when the first variable is set and, thereafter, gently attenuates. That is, the reactance Xα is temporarily set impedance. A value set by the first variable attenuates to zero based on a frequency set by the second variable. Therefore, as illustrated in FIG. 4B, the reactance Xv2 also attenuates according to fluctuation in the reactance Xα. When the reactance Xα attenuates to zero, the reactance Xv2 includes only the reactance Xv. Note that, in the example illustrated in FIG. 4B, the resistance Rv is 0.0 p.u.

2-5. Output Result Example of the Inverter

Figure 5A:
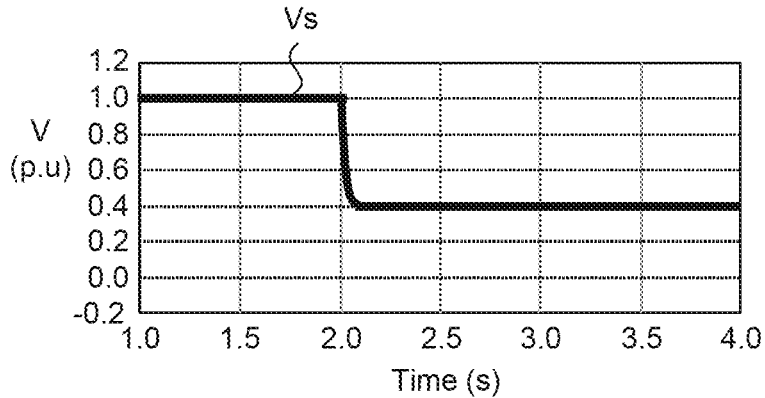
FIG. 5A, FIG. 5B, and Fig. 5C are diagrams for explaining an output result example of an inverter in the voltage control apparatus according to the embodiment.
Figure 5B:
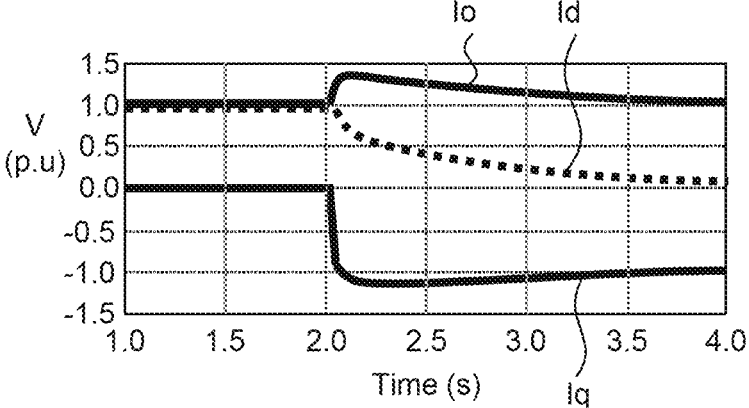
Figure 5C:
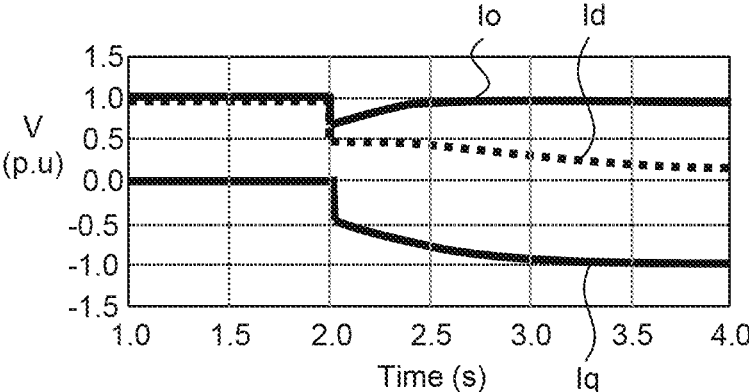

FIG. 5A. FIG. 5B, and FIG. 5C are diagrams for explaining an output result example of the inverter 12 in the voltage control apparatus 10 according to the embodiment. FIG. 5A illustrates an example of a waveform of the output voltage Vs in the case in which the Vs detection value decreases to 45%. FIG. 5B illustrates an example of a waveform of the output current Io, a waveform of the active current Id, and a waveform of the reactive current Iq output from the inverter 12 to the power grid 30 when the Vs detection value decreases to 45% and the reactance Xα is set to zero. FIG. 5C illustrates an example of a waveform of the output current Io, a waveform of the active current Id, and a waveform of the reactive current Iq output from the inverter 12 to the power grid 30 when the Vs detection value decreases to 45% and the first variable and the second variable are set for the reactance Xα.

In the example illustrated in FIG. 5B, when the Vs detection value decreases to 45% and the reactance Xα is set to zero, the output current Io consisting of the active current Id and the reactive current Iq exceeds 100% and is output at 140%.

In the example illustrated in FIG. 5C, when the Vs detection value decreases to 45% and the first variable and the second variable are set for the reactance Xα, the output current Io consisting of the active current Id and the reactive current Iq is output at 100% or less.

As explained above, when the AC voltage of the power grid 30 fluctuates, the active current Id and the reactive current Iq required of the power grid 30 are output based on the virtual impedance to reduce the difference in the AC power between the power grid 30 and the inverter 12. Further, the first variable and the second variable are set for the reactance Xα according to the voltage drop of the output voltage of the inverter 12. Consequently, it is possible to suppress an overcurrent in the output current Io of the inverter 12.

3. PROCESSING EXAMPLE

Figure 6:
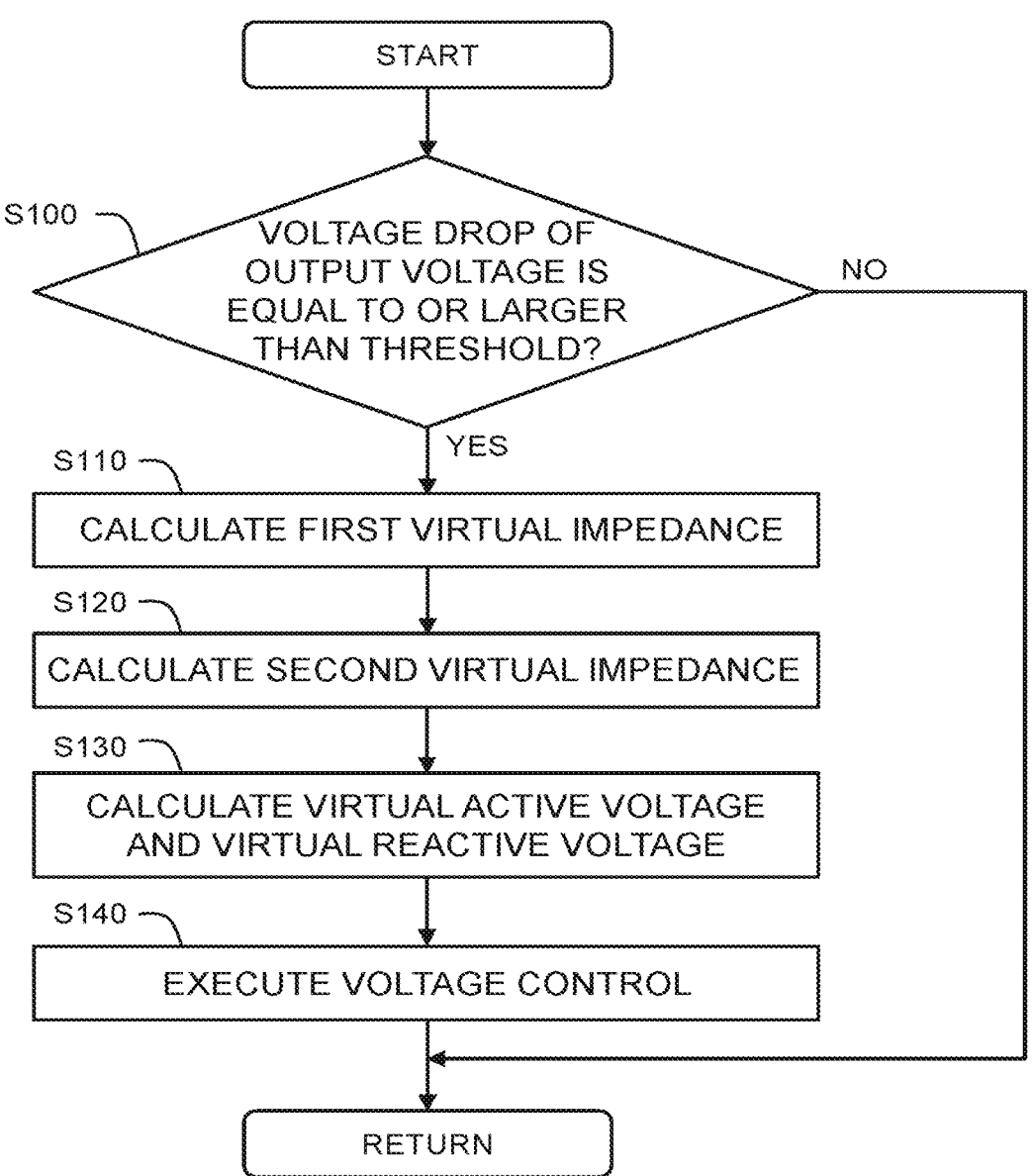
FIG. 6 is a flowchart illustrating a processing example of the controller in the voltage control apparatus according to the embodiment.

FIG. 6 is a flowchart illustrating a processing example of the controller 100 in the voltage control apparatus 10 according to the embodiment.

In step S100, the controller 100 determines whether a voltage drop of an output voltage of the inverter 12 is equal to or larger than a threshold. When the voltage drop of the output voltage is equal to or larger than the threshold (step S100; Yes), the processing proceeds to step S110. Otherwise (step S100; No), the controller 100 ends the processing.

In step S110, the controller 100 calculates first virtual impedance based on various variables. Thereafter, the processing proceeds to step S120.

Note that the first virtual impedance is calculated based on a predetermined condition. The predetermined condition means a condition that the reactive voltage Vq is zero, the reactive voltage command value Vqref is zero, a voltage value obtained by subtracting the virtual active voltage Vud and the active voltage Vd from the active voltage command value Vdref is zero, and a voltage value obtained by subtracting the virtual reactive voltage Vuq and the reactive voltage Vq from the reactive voltage command value Vqref is zero.

In step S120, the controller 100 calculates second virtual impedance to be temporarily added to the first virtual impedance. Thereafter, the processing proceeds to step S130.

In step S130, the controller 100 calculates the virtual active voltage Vud and the virtual reactive voltage Vuq by multiplying each of the active current Id and the reactive current Iq calculated by the output current Io, by the virtual impedance obtained by adding up the first virtual impedance and the second virtual impedance. Thereafter, the processing proceeds to step S140.

In step S140, the controller 100 executes, based on the virtual active voltage Vud and the virtual reactive voltage Vuq, voltage control such that each of the active current Id and the reactive current Iq output from the inverter 12 can approach each of the active current command value Idref and the reactive current command value Iqref required of the power grid 30.

4. EFFECTS

With the voltage control apparatus 10 according to the embodiment, when a voltage drop of the output voltage Vs of the inverter 12 is equal to or smaller than a threshold because of fluctuation in an AC voltage of the power grid 30, first virtual impedance is calculated based on the voltage command value Vref and the output voltage Vs of the inverter 12. second virtual impedance to be temporarily added to the first virtual impedance is calculated such that the output current Io of the inverter 12 does not exceed a rated value. In the voltage control apparatus 10, the virtual active voltage Vud and the virtual reactive voltage Vuq are generated based on virtual impedance obtained by adding up the first virtual impedance and the second virtual impedance. Further, in the voltage control apparatus 10, voltage control is performed based on the virtual active voltage Vud and the virtual reactive voltage Vuq such that each of the active current Id and the reactive current Iq output from the inverter 12 can approach each of the active current command value Idref and the reactive current command value Iqref required of the power grid 30. Consequently, even if the AC voltage of the power grid 30 fluctuates, it is possible to output the active current Id and the reactive current Iq required of the power grid 30. Therefore, it is possible to stabilize the power grid 30. Further, the output current Io is controlled by the second virtual impedance not to exceed the rated value. This leads to suppressing an overcurrent.

REFERENCE SIGNS LIST

1 . . . Power conversion system; 10 . . . Voltage control apparatus; 11 . . . Battery; 12 . . . Inverter; 20 . . . Transformer; 30 . . . Power grid; 100 . . . Controller; 101 . . . Active and reactive voltages calculation processing unit; 102 . . . Active and reactive currents calculation processing unit; 103 . . . VSG control unit; 104 . . . dq-axis voltage conversion unit; 105 . . . dq-axis current command calculation unit; 106 . . . Virtual impedance generation unit; 106a . . . First virtual impedance generation unit; 106b . . . Second virtual impedance generation unit; 107 . . . Virtual voltage generation unit; 108 . . . First output selection circuit; 109 . . . Second output selection circuit; 110 . . . Switching determination circuit; 111 . . . Addition and subtraction circuit; 111a . . . First addition and subtraction circuit; 111b . . . Second addition and subtraction circuit; 111c . . . Third addition and subtraction circuit; 111d . . . Fourth addition and subtraction circuit; 112 . . . Voltage control circuit

The invention claimed is:

1. A voltage control apparatus comprising:

an inverter that converts DC power output from a battery into AC power and supplies the AC power to a power grid; and circuitry connected to the inverter, wherein the circuitry is configured to execute:

when a voltage drop of an output voltage of the inverter is equal to or larger than a threshold because of fluctuation in an AC voltage of the power grid, processing for calculating first virtual impedance using variables including an active voltage command value and a reactive voltage command value calculated by a voltage command value, and an active current command value and a reactive current command value calculated by the output voltage and the voltage command value;

processing for calculating, such that an output current of the inverter does not exceed a rated value, second virtual impedance to be temporarily added to the first virtual impedance;

processing for calculating a virtual active voltage and a virtual reactive voltage by multiplying each of an active current and a reactive current calculated by the output current, by virtual impedance obtained by adding up the first virtual impedance and the second virtual impedance; and processing for performing voltage control based on the virtual active voltage and the virtual reactive voltage such that each of the active current and the reactive current is able to approach each of the active current command value and the reactive current command value required of the power grid.

2. The voltage control apparatus according to claim 1, wherein the circuitry is configured to, in the processing for calculating the second virtual impedance, when the voltage drop of the output voltage is equal to or larger than the threshold, set the second virtual impedance to a value corresponding to the output voltage, and when the voltage drop of the output voltage is smaller than the threshold, set the second virtual impedance to zero.

3. The voltage control apparatus according to claim 2, wherein the second virtual impedance is reactance consisting of amplitude set by a first variable and a frequency set by a second variable, and the circuitry is configured to, when the voltage drop of the output voltage is equal to or larger than the threshold, set a value of the first variable to be larger and set a value of the second variable to be smaller as the output voltage is smaller, and set the value of the first variable to be smaller and set the value of the second variable to be larger as the output voltage is larger.

4. The voltage control apparatus according to claim 2, wherein the variables further include an active voltage and a reactive voltage calculated by the output voltage, and the circuitry is configured to, in the processing for calculating the virtual impedance, calculate the virtual impedance based on a condition that the reactive voltage is zero, the reactive voltage command value is zero, a voltage value obtained by subtracting the virtual active voltage and the active voltage from the active voltage command value is zero, and a voltage value obtained by subtracting the virtual reactive voltage and the reactive voltage from the reactive voltage command value is zero.

5. The voltage control apparatus according to claim 2, wherein the first virtual impedance includes resistance and reactance, and the circuitry is configured to, in the processing for calculating the first virtual impedance, calculate each of the resistance and the reactance corresponding to the output voltage.

6. The voltage control apparatus according to claim 2, wherein the active current command value is calculated by multiplying a differential voltage obtained by calculating a difference between the voltage command value and the output voltage, by a constant value, and the reactive current command value is calculated such that a sum obtained by adding up a square value of the active current command value and a square value of the reactive current command value is 1.

7. The voltage control apparatus according to claim 3, wherein the variables further include an active voltage and a reactive voltage calculated by the output voltage, and the circuitry is configured to, in the processing for calculating the virtual impedance, calculate the virtual impedance based on a condition that the reactive voltage is zero, the reactive voltage command value is zero, a voltage value obtained by subtracting the virtual active voltage and the active voltage from the active voltage command value is zero, and a voltage value obtained by subtracting the virtual reactive voltage and the reactive voltage from the reactive voltage command value is zero.

8. The voltage control apparatus according to claim 3, wherein the first virtual impedance includes resistance and reactance, and the circuitry is configured to, in the processing for calculating the first virtual impedance, calculate each of the resistance and the reactance corresponding to the output voltage.

9. The voltage control apparatus according to claim 3, wherein the active current command value is calculated by multiplying a differential voltage obtained by calculating a difference between the voltage command value and the output voltage, by a constant value, and the reactive current command value is calculated such that a sum obtained by adding up a square value of the active current command value and a square value of the reactive current command value is 1.

10. The voltage control apparatus according to claim 1, wherein the variables further include an active voltage and a reactive voltage calculated by the output voltage, and the circuitry is configured to, in the processing for calculating the virtual impedance, calculate the virtual impedance based on a condition that the reactive voltage is zero, the reactive voltage command value is zero, a voltage value obtained by subtracting the virtual active voltage and the active voltage from the active voltage command value is zero, and a voltage value obtained by subtracting the virtual reactive voltage and the reactive voltage from the reactive voltage command value is zero.

11. The voltage control apparatus according to claim 1, wherein the first virtual impedance includes resistance and reactance, and the circuitry is configured to, in the processing for calculating the first virtual impedance, calculate each of the resistance and the reactance corresponding to the output voltage.

12. The voltage control apparatus according to claim 1, wherein the active current command value is calculated by multiplying a differential voltage obtained by calculating a difference between the voltage command value and the output voltage, by a constant value, and the reactive current command value is calculated such that a sum obtained by adding up a square value of the active current command value and a square value of the reactive current command value is 1.

13. The voltage control apparatus according to claim 12, wherein the active current command value is represented by a percentage, and when a calculation result of the active current command value exceeds 100%, the circuitry sets the active current command value to 100%.

14. A voltage control method comprising:

converting, using an inverter, DC power output from a battery into AC power and supplying the AC power to a power grid;

when a voltage drop of an output voltage of the inverter is equal to or larger than a threshold because of fluctuation in an AC voltage of the power grid, calculating first virtual impedance using variables including an active voltage command value and a reactive voltage command value calculated by a voltage command value, and an active current command value and a reactive current command value calculated by the output voltage and the voltage command value;

calculating, such that an output current of the inverter does not exceed a rated value, second virtual impedance to be temporarily added to the first virtual impedance;

calculating a virtual active voltage and a virtual reactive voltage by multiplying each of an active current and a reactive current calculated by the output current, by virtual impedance obtained by adding up the first virtual impedance and the second virtual impedance; and performing voltage control based on the virtual active voltage and the virtual reactive voltage such that each of the active current and the reactive current is able to approach each of the active current command value and the reactive current command value required of the power grid.

* * * * *